United States Patent
Farrow et al.

(10) Patent No.: US 6,282,248 B1
(45) Date of Patent: Aug. 28, 2001

(54) VARIABLE BAUD RATE DEMODULATOR

(75) Inventors: Cecil William Farrow, Highland; Daniel Udovic, Aberdeen; Kalavai Janardhan Raghunath, Chatham, all of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/114,948

(22) Filed: Jul. 14, 1998

(51) Int. Cl.$^7$ .................................................... H04L 27/14
(52) U.S. Cl. ........................ 375/324; 375/340; 329/304; 329/306
(58) Field of Search ..................................... 375/261, 324, 375/326, 340; 329/304, 306, 308; 348/554, 555

(56) References Cited

U.S. PATENT DOCUMENTS

| | | |
|---|---|---|
| 4,866,647 | 9/1989 | Farrow . |
| 5,612,975 | * 3/1997 | Becker et al. ........................ 375/319 |
| 5,844,948 | * 12/1998 | Ben-Efraim et al. ................. 375/344 |
| 6,067,319 | * 5/2000 | Copeland ............................. 375/232 |

OTHER PUBLICATIONS

C.W. Farrow, "A Continuously Variable Digital Delay Element", IEEE, 1988, pp. 2641–2645.

Tony Kirke, "Interpolation, Resampling, and Structures for Digital Receivers", Communication Systems Design, Jul. 1998, p.p. 43–49.

* cited by examiner

Primary Examiner—Amanda T. Le
(74) Attorney, Agent, or Firm—William H. Bollman (57) ABSTRACT

A method of efficiently demodulating and isolating a signal within a fixed possibly wider band spectral region, having any of a wide range of baud rates. The signal is sampled at a fixed, first frequency which remains fixed no matter what the baud rate. Thus, the sample rate does not necessarily correspond to the desired baud rate. The sampled signal is then demodulated and low pass filtered to create baseband samples at the first frequency, which are then subject to user-specified arbitrary rate change in a continuously variable interpolator/decimator (continuously variable digital delay (CVDD) device), and decimated by a programmable power of 2, to produce samples at a second frequency. The second frequency is preferably determined to be a whole number multiple of the desired baud rate, e.g., twice the desired baud rate. The samples are equalized to produce output symbols at the target baud rate. Based on this method, a demodulator can receive signals of varying bandwidth and baud rates at arbitrary spectral locations within a possibly wider bandwidth aggregate channel span, and can adapt its target baud rate for each signal to be the actual baud rate of the derived incoming data signal within the possibly wider bandwidth aggregate channel span.

33 Claims, 5 Drawing Sheets

VARIABLE BAUD RATE DEMODULATOR

This application is similar to the following co-pending U.S. Patent Applications, all of which are expressly incorporated herein by reference:

U.S. patent application Ser. No. 60/055,694, entitled "Variable Baudrate Demodulator", filed Jul. 15, 1997;

U.S. patent application Ser. No. 09/019,320, entitled "Amplitude Based Course Automatic Gain Control Circuit", filed Jul. 15, 1997, now U.S. Pat. No. 6,081,565;

U.S. patent application Ser. No. 09/019,402, entitled "Power Based Digital Automatic Gain Control Circuit", filed Jul. 15, 1997, pending;

U.S. patent application Ser. No. 08/1993,465, entitled "Equalization Circuit for Unknown QAM Constellation Size", filed Jul. 15, 1997, now U.S. Pat. No. 6,108,375;

U.S. patent application Ser. No. 60/052,572, entitled "Fixed Clock Based Arbitrary Symbol Rate Timing Recovery Loop", filed Jul. 15, 1997;

U.S. patent application Ser. No. 09/019,320, entitled "Fixed Clock Based Arbitrary Symbol Rate Timing Recovery Loop", filed Jul. 15, 1997, now U.S. Pat. No. 6,081,565;

U.S. patent application Ser. No. 60/052,572, entitled "Amplitude Based Coarse AGC", filed Jul. 15, 1997;

U.S. patent application Ser. No. 08/777,889, entitled "Vector Tracking Filter", filed Dec. 31, 1996, now U.S. Pat. No. 5,963,594;

U.S. patent application Ser. No. 08/777,893, entitled "Variable Baudrate Demodulator", filed Dec. 31, 1996, now U.S. Pat. No. 5,870,442; and U.S. patent application Ser. No. 09/114,949, entitled "Fixed Clock Based Arbitrary Symbol Rate Timing Recovery Loop", co-filed on even date herewith.

BACKGROUND OF THE INVENTION

1. Field of the Invention

This invention relates generally to the demodulation of a digital signal. More particularly, it relates to an adaptive technique for demodulating a modulated digital signal having a widely variable baud rate.

2. Background of Related Art

High speed data transmission systems, e.g. modems, operate in general by modulating a high frequency carrier corresponding to a desired channel with a low frequency digital signal at a fixed baud rate. The modulated data signal is transmitted to a receiver, which demodulates the received high frequency modulated signal to recover digital symbols at the desired baud rate.

In such data transmission systems, the baud rate of the transmitting and receiving devices are generally fixed at a discrete level, and generally include a modulator and/or demodulator which operates at a fixed baud rate. Any fine adjustments which might be made in the baud rate of the receiver are typically made in the sampling rate of an analog-to-digital (A/D) converter sampling the incoming analog signal. However, these conventional baud rate adjustments are limited to just a few hundreds or thousands of parts per million of the baud rate, and are not able to adjust through a wide range of baud rates without requiring additional and/or different filtering for each different baud rate. The need for additional and/or different filtering for each received baud rate is cumbersome and expensive to implement. Moreover, different receivers must be developed and manufactured for each expected baud rate.

Many signal processing systems are hybrid analog/digital systems whereby front end signal processing is performed using analog circuit functions, and remaining signal processing is performed using digital computation after the intermediate analog signal has been converted to a digital number stream. Quadrature Amplitude Modulation (QAM) modem receivers are examples of hybrid systems typically implemented in this way.

A quadrature demodulator is often used within a QAM modem receiver to frequency-translate a bandpass spectral region of an intermediate frequency analog signal into two lowpass analog signals spectrally centered at or near 0 Hertz (Hz). Typically, the analog signals being demodulated have been band-limited to a specific intermediate frequency (IF) spectral region (fixed center frequency, fixed bandwidth equal the constant bandwidth channel span) using dedicated analog circuitry. The two outputs produced by the quadrature demodulator are baseband signals, having only low frequency spectral content, and exhibit a mathematical quadrature relationship with respect to each other.

A quadrature demodulator/analog-to-digital converter subsystem is used to transform a passband analog input signal into two digital number streams. The number streams produced by this subsystem approximate the two baseband analog signals produced by the quadrature demodulator defined above. Such quadrature demodulator/analog-to-digital converter subsystems are typically designed to handle only a specific channel bandwidth and to produce baseband streams of specific, fixed output rate. Such quadrature digital number streams are often used as input to digital signal processing (DSP) algorithms for communication, process control, estimation, and other signal transformation purposes, in addition to their application to QAM modem receivers.

It is generally recognized that there are system advantages to replacing the analog quadrature demodulation function described above with an equivalent digital quadrature demodulation set of operations. With this approach, A/D conversion is performed upon the single, fixed-bandwidth, bandpass IF analog aggregate channel input signal to the replaced analog quadrature demodulator rather than upon the replaced demodulator's two low pass output signals. In order for the resulting set of uniformly-spaced amplitude samples to retain all information contained within the original waveform (i.e., the original continuous time analog signal, using only this set of discrete samples, can be re-synthesized), the sampling rate (in Hz) used for this A/D conversion must generally satisfy three design constraints:

(1) the sampling rate $f_s$ must be greater than the bandwidth of the bandpass analog signal being processed;

(2) the resulting sampled waveform is high pass in spectral content (no DC component); and (3) the resulting sampling rate $f_s$ sampling-produced spectral translates of the negative and positive components of the original bandpass analog signal do not exhibit any spectral image overlap.

Having satisfied these three sampling rate restrictions, the system designer is usually free to perform any additional required linear filtering operations upon the digital signal either (a) by passband digital filtering the real number stream produced by the A/D converter before digital quadrature demodulation, or (b) by mathematically-equivalent lowpass digital filtering a complex number stream (mathematical notation for filtering two real number streams) after digital quadrature demodulation.

Whereas both the passband or baseband signal processing approaches have near-equivalent implementation complexity when the signal to be processed is of fixed bandwidth and fixed location within the fixed bandwidth IF channel, the baseband signal processing approach proves more efficient for implementing systems which must isolate and demodulate arbitrary baud rate transmit signals located at arbitrary spectral positions within a fixed bandwidth, multi-channel aggregate analog signal. For such applications, an analog bandpass filter precedes the A/D converter and is used to remove out-of-aggregate-band energy from the analog signal to be passed to the A/D converter.

The preferred A/D sampling rate for a more conventional quadrature demodulator/A/D converter subsystem is an integral multiple of the subsystem output sample rate. Satisfying this constraint reduces complexity of the rate decimator algorithm that is otherwise generally considered necessary to handle more arbitrary input to output sample rate relationships.

There exists a need for a variable bandwidth channel tuner/variable baud rate QAM demodulator subsystem that operates at a fixed sampling rate and which can produce high spectral fidelity digital number streams at arbitrary output rates. Furthermore, there exists a need for a variable bandwidth channel tuner/variable baud rate QAM demodulator subsystem having fixed and efficient computational complexity, independent of the specific input sampling rate/ output rate ratio. There also exists a need for a variable bandwidth channel tuner/variable baud rate QAM demodulator subsystem which enables a QAM modem receiver to feature a fixed sampling rate, yet handle signals over wide, continuously variable baud rate and spectral location spans. There is a further need for a receiver which is efficient in circuit usage and which can receive any of a wide range of baud rates, e.g., varying by a factor of 30 or more.

SUMMARY OF THE INVENTION

It is an aspect of the invention to provide a method of demodulating a signal that can be used to demodulate incoming signals having varying baud rates from a possibly wider bandwidth aggregate channel line signal. Such a method includes the step of sampling the signal at a first frequency. The sampled signal is then demodulated to create baseband samples at the first frequency. The baseband samples are then interpolated to produce samples at a second frequency. The second frequency is preferably determined to be a whole number multiple of twice a target baud rate. For example, the second frequency can be a power of two multiple of twice the target baud rate. The interpolated samples are then decimated to produce samples at a third frequency, which is preferably twice the target baud rate. The decimated samples are then equalized to output symbols at a fourth frequency which corresponds to the target baud rate. Based on this method, a demodulator can receive possibly wider band signals containing multiple signals of varying baud rates, and can adapt its programmed nominal baud rate for each signal to be the baud rate of the incoming signal.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a demodulator which has the bility to efficiently receive and demodulate a modulated transmit signal having any of a wide range of baud rates. Importantly, rather than adjust the sampling rate of the digital signal as the baud rate changes as in conventional devices, the present invention utilizes a fixed sampling rate no matter what the desired or target baud rate is, and adjusts the desired baud rate with a continuously variable interpolator/decimator device.

Figure 1:
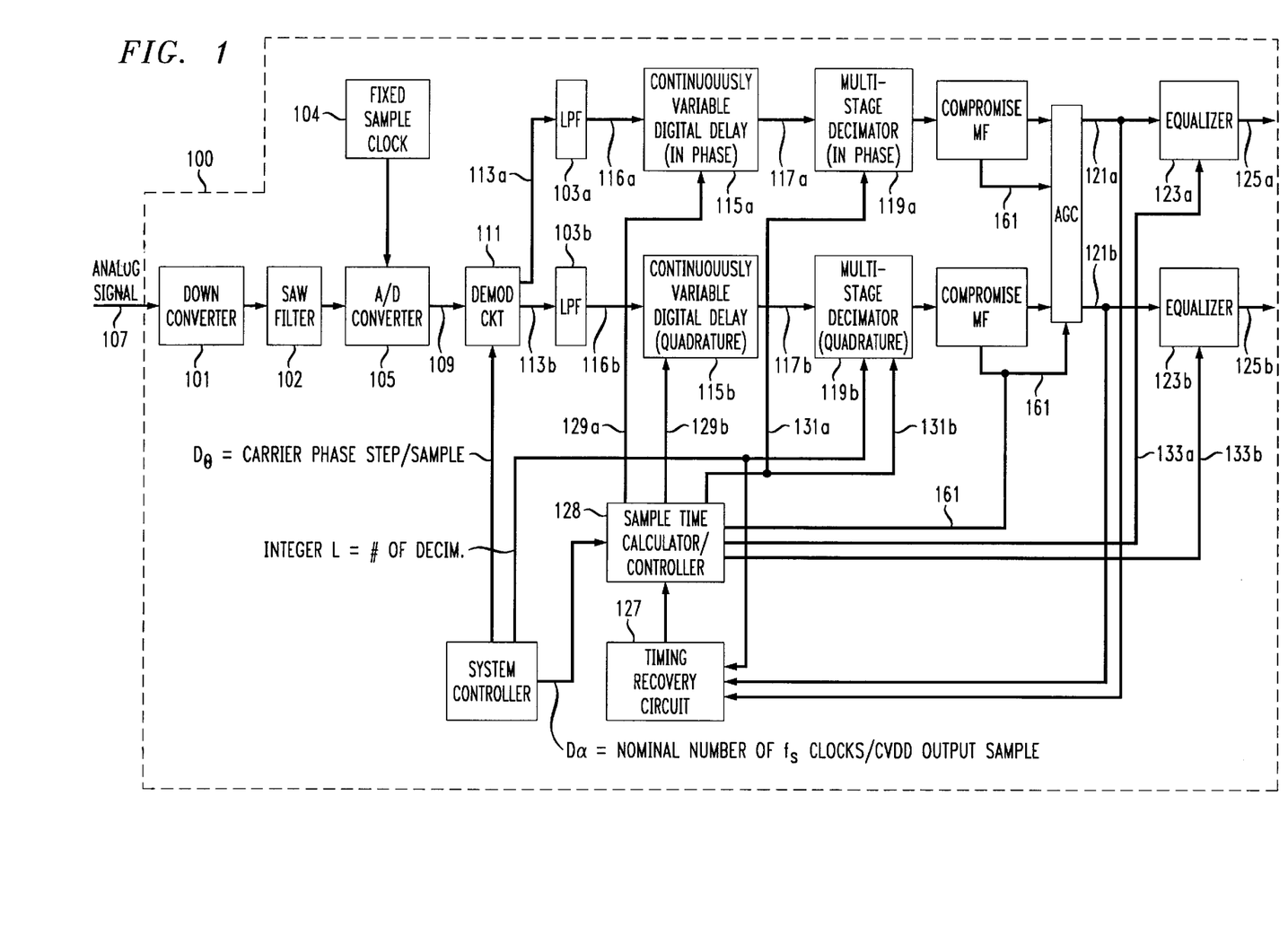
FIG. 1 shows a first embodiment of a variable baud rate demodulator in accordance with the principles of the present invention.

FIG. 1 shows a first embodiment of a demodulator 100 in accordance with the principles of the present invention. While the present invention is shown with respect to a modem receiver, the principles of the present invention are applicable to other demodulators and receivers such as in high definition television (HDTV) receivers and/or receivers making use of the vestigial side band (VSB).

FIG. 1 shows a downconverter 101, SAW filter 102, AND converter 105, demodulator circuit 111, low pass filters 103a, 103b, interpolator/decimators (continuously variable delay devices) 115a, 115b, decimators 119a, 119b, compromise matched filters, gain control devices 122a, 122b, and equalizers 123a, 123b in series to provide In-Phase and Quadrature output digital signals 125a, 125b, respectively, at the desired baud rate from a input modulated analog signal 107. A suitable continuously variable digital delay (CVDD) device is described in U.S. Pat. No. 4,866,647.

In particular, the received analog signal 107 is input to the downconverter 101, which downconverts the analog signal 107 to an intermediate frequency (IF) such as a 6 MHz bandwidth signal having a center frequency of 44 MHz. The downconverted signal is then filtered by an acoustic wave SAW filter 102. The downconverter 101 and/or SAW filter 102 may or may not be necessary depending upon the particular application.

The downconverted, filtered signal is sampled at a fixed rate in an A/D converter 105. The A/D converter 105 produces, e.g., 12-bit samples 109 at the fixed sampling frequency. Importantly, the A/D converter 105 of the present invention receives a fixed rate sample clock 104 for use in the reception of all baud rate signals.

Conventional receivers have the capability to make small adjustments to the output baud rate by adjustment of the sampling rate of an A/D converter. These adjustments to the A/D converter sample rate are typically provided by a voltage controlled oscillator (VCO) contained within a feedback loop. However, VCOs typically have a limited range of adjustment thus constraining the range of baud rates which the demodulator may receive. Moreover, if the sample rate of the A/D converter 105 were to be varied as in conventional devices to receive substantially different baud rate signals, different filters would be needed for each of the different baud rates.

In contrast, the use of a fixed rate sample clock in accordance with the principles of the present invention greatly simplifies filtering and other aspects of the signal processing and provides for an efficient demodulation of a signal at any of a wide range of baud rates. Moreover, the fixed sample clock of the A/D converter 105 need not be an integral of the desired baud rate as in conventional devices.

In the disclosed embodiment, the fixed sampling rate should be, e.g., at least equal to the passband bandwidth of the signal from the SAW filter 102. Thus, for a 6 MHz passband bandwidth signal as in the disclosed example, the sampling rate of the A/D converter 105 should be at least 6 mega samples per second.

Some spectral translation is preferably performed by the A/D converter 105. For instance, if the fixed sample clock 104 is set to cause he A/D converter 105 to sample at 36 MHz, replication of the spectrum will be caused every 36 MHz. Thus, a translated image having a 6 MHz bandwidth will be formed with a center frequency at:

44 MHz–36 MHz=8 MHz

The demodulator circuit 111 receives the fixed rate samples 109 and downconverts the IF signal 109 to baseband in both an In-Phase component signal 113a and a Quadrature component signal 113b. The In-Phase and Quadrature signals can be provided, for example, in either an interleaved fashion over a single line, or can each be provided as an output of the demodulator circuit 111 on its own line. The demodulator circuit 111 has a programmable demodulation rate based on the center frequency of the desired spectrally translated signal output from the A/D converter 105, e.g., 8 MHz in the example. Programmable continuously variable rate interpolator/decimators (e.g., continuously variable digital delay (CVDD) devices) 115a, 115b, plus half rate filter/decimator cascade change the rate of the digital samples from the demodulator circuit 111 based on the desired baud rate such that the rate at which samples are produced by the decimators 121a, 121b is, e.g., twice the desired or target baud rate.

The In-Phase component signal 113a and the Quadrature component signal 113b from the demodulation circuit 111 are each low pass filtered by respective low pass filters 103a, 103b. The low pass filters 103a, 103b may have any value appropriate to the application, e.g., having a cutoff frequency of 3 MHz in the disclosed example. Normally, these filters would pass only the baseband "aggregate" signal spectral translate of the demodulated aggregate signal.

The low pass filtered In-Phase and Quadrature component signals 113a, 113b are input to respective continuously variable digital delay devices 115a, 115b, which decimate (or interpolate) by an arbitrary rate chosen to provide an output from the decimators 121a, 121b of twice the desired baud rate. The continuously variable digital delay devices 115a, 115b produce interpolated samples 117a, 117b.

Typically, the continuously variable digital delay devices 115a, 115b interpolate or decimate as necessary to obtain an output of $2^{(k+1)}$ times the baud rate of the desired channel signal, where k is a programmable integer determined by the rates of the fixed bandwidth of the passband aggregate channel signal at the A/D converter to the bandwidth of the desired variable baud rate channel signal contained within the aggregate IF signal. For a given variable baud rate application, the variable baud rate demodulator would be designed to have a maximum of M stages of half rate decimation filtering, where M is determined by the fixed rate of aggregate channel signal bandwidth to bandwidth of the smallest bandwidth desired channel signal. Specifically, M=LGI(log$_2$(aggregate channel bandwidth/smallest desired channel bandwidth)). The formula allows for one additional set of filtering operations to be performed at full rate, i.e., a $2f_{baud}$ samples per second input stream produces a $2f_{baud}$ samples per second output stream. This final filter stage implements efficient, fixed coefficient, compromise matched filtering to improve subsequent equalizer performance.

The interpolated signals output from the continuously variable interpolator/decimator devices 115a, 115b are successively decimated by powers of two in multi-stage half rate filter decimators 119a, 119b to produce decimated samples 121a, 121b. The half rate filtering rids the signal of the upper half of the spectral energy. Each multi-stage decimator 119a, 119b includes a plurality of stages of half rate filtering sufficient to provide the desired range in the output baud rate, as discussed above. The number of stages utilized in each multi-stage decimator 119a, 119b is programmably adjusted by the system controller, which has a prori knowledge of the desired baud rate.

For instance, 3 stages were implemented in the multi-stage decimators 119a, 119b to provide a decimation of $2^3$ or 8 (which is close to 10) to provide a range in the baud rate of, e.g., 1 Mbaud/s to 10 Mbaud/sec. The process of decimation, like the process of interpolation, is well known to those of skill in the art. Details of such half rate filters forming a multi-stage decimator are provided in copending Patent U.S. application Ser. No. 09/019,320, entitled "Fixed Clock Based Arbitrary Symbol Rate Timing Recovery Loop", filed Jul. 15, 1997.

The continuously variable digital delay devices 115a, 115b are controlled by a sample time offset calculator/controller timing recovery circuit 127, which provides an estimate of the output baud rate error. The timing recovery circuit 127 receives decimated samples 121 and produces sample time offset adjustment signal. Signals 131b a, 131b, 161, 133a and 133b are provided respectively to the continuously variable interpolators/decimators 115a, 115b, decimators 119a, 119b and equalizers 123a and 123b.

The equalizers 123a and 123b in the In-Phase and Quadrature signal paths, respectively, provide equalization and output symbols at the desired baud rate. The In-Phase and Quadrature equalizers 123a, 123b, respectively, in the disclosed embodiment require an input signal at a rate of 2 times the desired output baud rate.

The equalizers 123a, 123b operate on the decimated samples 121a, 121b to produce output symbols 125a, 125b at the fourth (i.e., target) frequency. According to the invention, the equalizers 123a, 123b operate in a conventional manner, but additionally are responsive to control signals 133a, 133b to perform equalizing operations only when control signals 133a, 133b are valid. Thus, control signals 133a, 133b are typically a one-bit signal having either a valid state or an invalid state. Additional features of an equalizer suitable for use as equalizer 123 is provided in co-pending U.S. patent application Ser. No. 08/993,465 entitled "Equalization Circuit for Unknown QAM Constellation Size", filed Jul. 15, 1997, the specification of which is expressly incorporated herein by reference.

Figure 2:
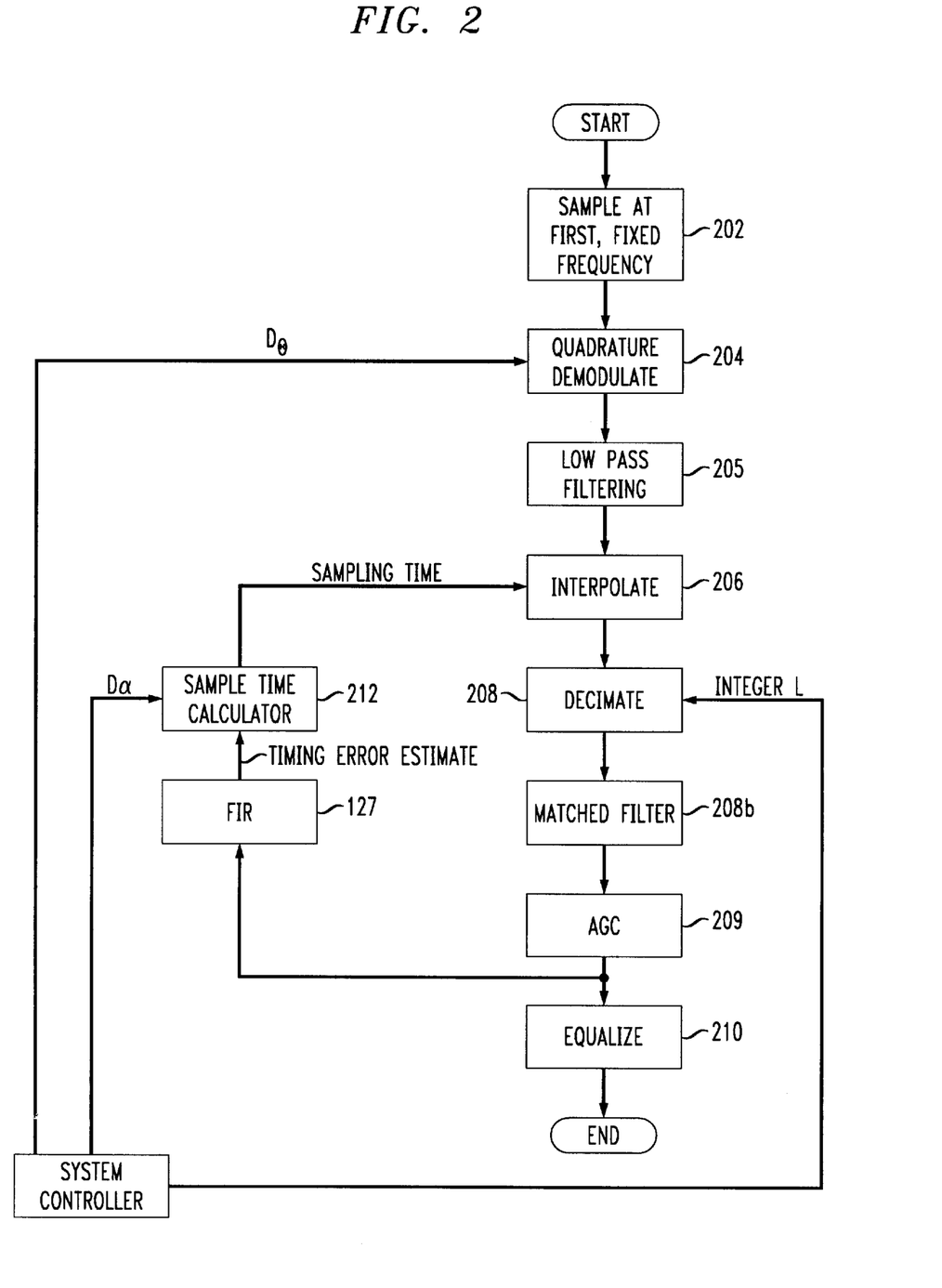
FIG. 2 is a flowchart showing a process of variable bandwidth tuning/arbitrary output rate QAM demodulating in accordance with the principles of the present invention.

Operation of the demodulator 100 of FIG. 1 is shown, for example, in the flow chart of FIG. 2.

In particular, at step 202, the incoming analog signal 107 is down converted and filtered and then sampled by the A/D converter 105 at a fixed frequency to produce fixed rate samples 109. In contrast to conventional demodulators, the fixed rate of the sampling need not be an integer multiple or divisor of the desired baud rate.

At step 204, the demodulation circuit 111 demodulates the fixed rate samples 109, then low pass filters these samples (step 205), to create baseband samples 113a, 113b, and outputs the baseband samples 113a, 113b at the same fixed sampling rate used for the A/D converter 105.

At step 206, the continuously variable digital delay device 115 interpolates (or decimates) the baseband samples 113a, 113b to produce interpolated samples 117a, 117b at a second frequency, e.g., at $2^{K+1}f_{baud}$.

At step 208a, the multi-stage decimators 119a, 119b decimate the interpolated samples 117a, 117b to produce decimated samples 121a, 121b at a third frequency, e.g., at two times the desired baud rate. At step 208b, a final stage of compromise matched filtering is performed at the third frequency rate. At step 209, an AGC produces a fixed energy complex output signal to both the equalizer and timing recovery block at the third frequency rate. At step 127, a timing error signal is developed based on the AGC output signal. This error signal together with the time step parameter Dα are used by the sample time offset calculator to determine the next sample instant when the CVDD should output the next in-phase/quadrature baseband sample pair.

Finally, at step 210, the equalizers 123a, 123b produce output symbols 125a, 125b at a fourth frequency, i.e., at the desired baud rate.

Thus, in accordance with the principles of the present invention, the output symbols 125a, 125b will be output at the target baud rate regardless of the rate of the fixed sampling frequency used in step 202. This is because the timing recovery circuit 127 receives the decimated samples 121a, 121b and provides control signals 129a, 129b, 131a, 131b, 133a and 133b as feedback to the continuously variable interpolator/decimators 115a, 115b, to the multi-stage decimators 119a, 119b, and to the equalizers 123a, 123b.

Timing recovery circuit 127 produces a timing error signal to the sampling time calculator/controller circuit which produces control signals 129a, 129b, 131a, 131b, 161, 133a and 133b based on the target baud rate. Note that control signals 131a, 131b are M vectors of control signals, and that control signal 161 goes to the matched filter (MF) and automatic gain control (AGC) circuits. Timing recovery circuit 127 can either have the target baud rate stored therein, or can be supplied the target baud rate from, for example, a distant end data transmission device.

The fs sample time offset calculator, according to the invention, has a priori knowledge of the nominal target baud rate, and uses the timing recovery circuit error signal to provide control signals 129a, 129b, 131a, 131b, 133a and 133b to cause the output of the demodulator circuit 111 to be at the actual received signal baud rate. To perform this function, the timing recovery circuit 127 calculates, based on the target baud rate, the appropriate values for timing error signal. The sample time calculator/controller uses this information and rate parameter Dα to produce control signals 129a, 129b, 131a, 131b, 133a and 133b.

Control signals 129a and 129b cause the CVDD devices 115a, 115b to dynamically set the sample instant through the CVDD devices 115a, 115b to adjust the third frequency, i.e. the frequency of decimated samples 121a, 121b, to be a whole number multiple of the target baud rate, e.g., to be twice the target baud rate. In one example, control signals 129a, 129b are multi-bit signals, such as a 16-bit signals, and contain information corresponding to the desired sampling time instants. Interpolators 115a, 115b respond to control signals 129a, 129b to output interpolated samples 117 at the second frequency. Further details of continuously variable interpolator/decimators suitable for use in the present invention are provided in co-pending U.S. patent Application Ser. No. 09/019,320, entitled "Fixed Clock Based Arbitrary Symbol Rate Timing Recovery Loop", filed Jul. 15, 1997.

Control signals 131a, 131b, for example, are multi-bit signals (typically 2–3 bits), that provide decimators 119a, 119b, respectively, with a proper degree of decimation. In the disclosed embodiment, the control signals 131a, 131b are configured at modem startup by the system controller to correspond to the number L of decimation stages to utilize in decimation. A 2-bit control signal 131a, 131b could support the use of from 1 to 4 decimation stages, or a 3-bit control signal could support the use of from 1 to 8 decimation stages.

For example, control signals 131a, 131b may contain a value, such as the value two, which controls decimators 119a, 119b to drop every second sample, thereby causing decimators 119a, 119b to output decimated samples 121a, 121b at a frequency (the third frequency) which is one half the second frequency. In another example, control signals 131a, 131b can have a value of four which controls decimators 119a, 119b to drop three of every four samples, thereby causing the third frequency to be one fourth of the second frequency.

Figure 3:
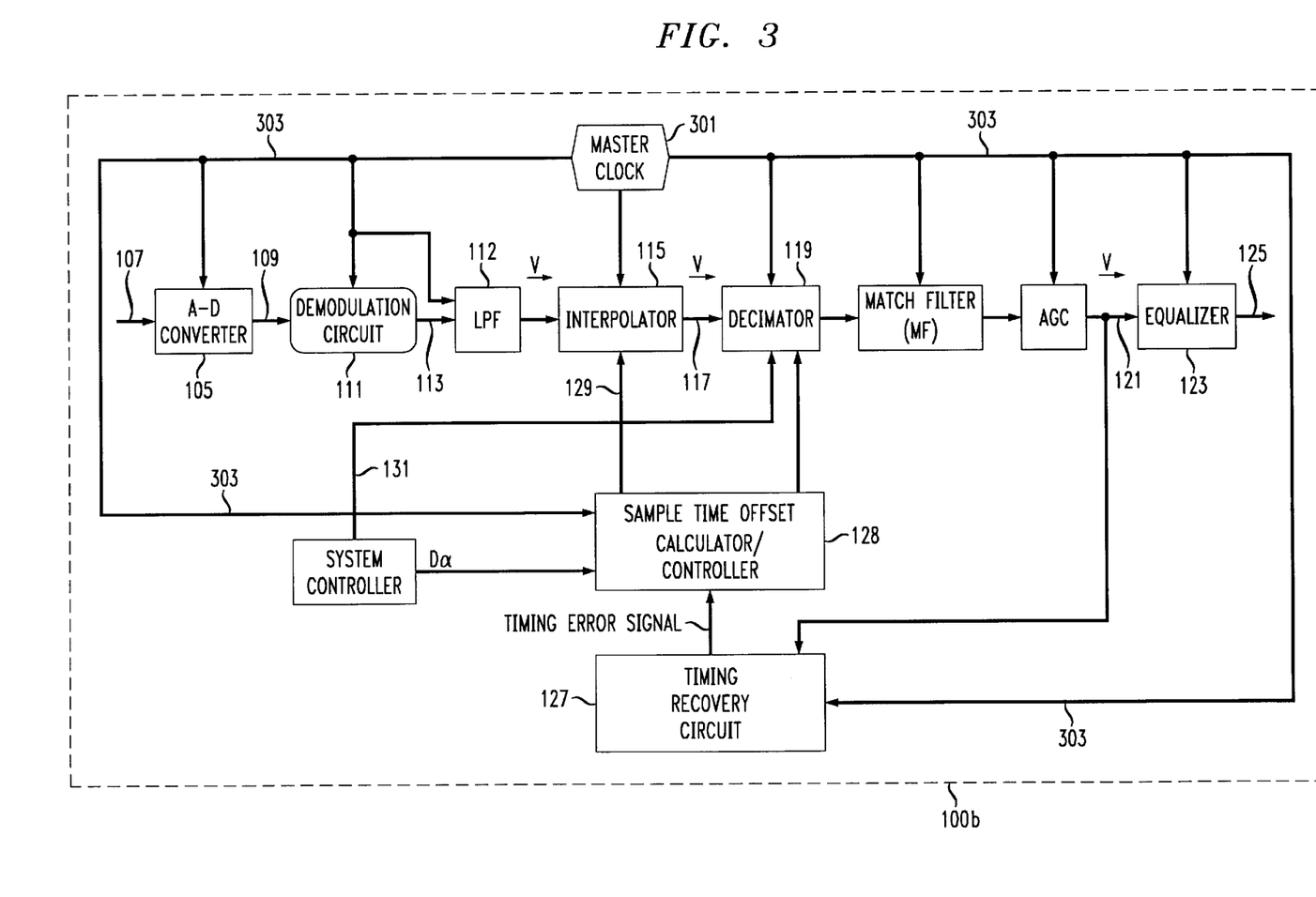
FIG. 3 shows a closed loop embodiment of a variable baud rate demodulator in accordance with the principles of the present invention.

FIG. 3 shows a generalized block diagram of the demodulator 100 shown in FIG. 1 but in an alternative embodiment utilizing a master clock signal.

In particular, FIG. 3 includes a master clock 301 to provide a master clock signal 303 to the A/D converter 105, the demodulator circuit 111, the interpolator 115, the low pass filter 103, the decimator 119, the compromise match filter, the AGC, and the equalizer 123. In accordance with this aspect of the present invention, even though the aforementioned devices operate according to the same master clock signal 303, the demodulator 100b according to this aspect of the present invention can adapt to a wide range of baud rates.

For example, in one embodiment, the target baud rate can vary from 870 KHz to 8.7 MHz. In this example, master clock 301 produces a master clock signal 303 at the rate of, e.g., 72 MHz. The equalizer 123, although clocked at the 72 MHz rate, effectively processes a 870 Kbaud to 8.7 Mbaud signal based on control signal 133.

In one application, a demodulator 100 such as that shown in FIGS. 1 or 3, can be incorporated into a television, such as, for example, a high definition television. The sample time calculator/controller 128 can be supplied the nominal baud rate of each incoming signal, e.g., channel by the system controller, e.g., a microprocessor, microcontroller, or digital signal processor (DSP). In such an application, as a user changes the channel of the television, the baud rate of the newly tuned channel will differ from the baud rate of the previously tuned channel. Accordingly, the sample time controller/calculator will alter control signals 129, 131, 161 and 133 based on this information so that the demodulator 100 will output a data symbol stream 125 at the baud rate of the newly tuned channel.

For example, presume that the target baud rate for the output signal 125 is 2.1 Mbaud/s. In accordance with the principles of the present invention, the timing recovery circuit 127 will output control signal "timing error" to the sampling time calculator/controller circuit which will produce clock control signals 129 and 131 to cause the decimator 119 to output samples at, e.g., two times the baud rate, i.e., at 4.2 Mbaud/s. Control signal 129 will also cause the continuously variable interpolator/decimator 115 to output interpolated samples 117 at a system controller specified rate which is a multiple of 4.2 Mbaud/s (or MHz), e.g., at 16.8 Mbaud/s.

Figure 4:
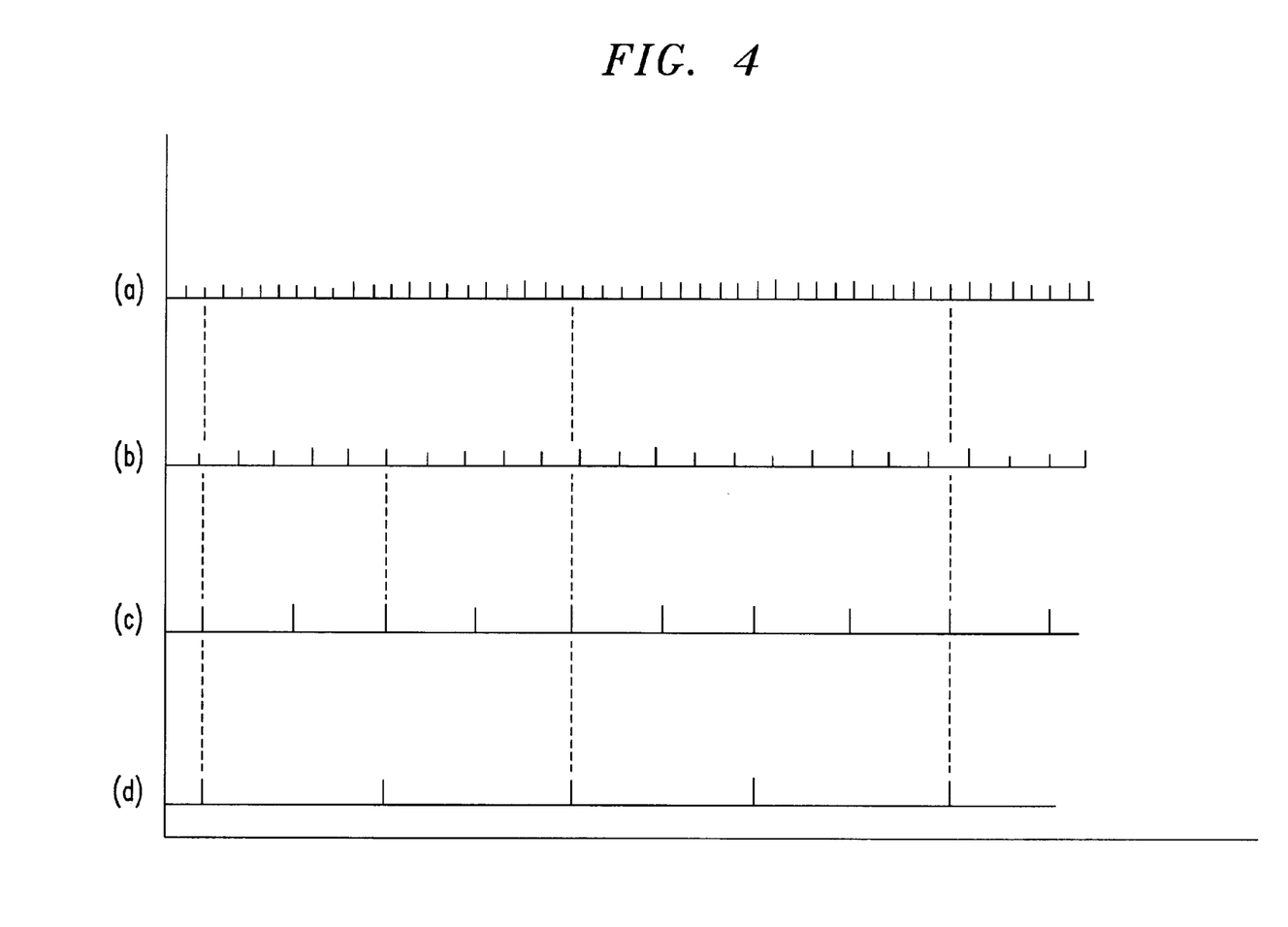
FIG. 4 provides a timing chart showing the timing relationship between various signals and samples in a demodulator according to the principles of the present invention operating on an exemplary input signal and having an exemplary target baud rate.

FIG. 4 provides a timing chart associated with this example. The symbols shown in FIG. 4 are merely representative of clock signals and not intended to provide information regarding the amplitude or duty cycle of the various signals depicted.

In particular, in FIG. 4, waveform (a) depicts the clock pulses associated with the 72 MHz master clock signal from the master clock 301. Waveform (b) depicts the timing of baseband samples occurring at a frequency of 36 MHz. The continuously variable interpolator/decimator 115 inputs the samples shown in waveform (b) provided at the 36 MHz rate and produces samples at a 16.8 Mbaud/s timing as depicted in waveform (c) of FIG. 4. The multi-stage decimator 119 then produces samples at a timing depicted in waveform (d) yielding a 4.2 Mbaud/s sampling rate, which are input to the matched filter (MF). The output of the MF is gain-controlled by the AGC circuit and then input to the equalizer 123, which operates in accordance with the control signal 133 to produce output symbols at the desired or target 2.1 Mbaud/s baud rate.

A demodulator in accordance with the principles of this aspect of the present invention thus operates to provide for the demodulation of signals having any of a wide range of bandwidths and baud rates. The present invention relates to demodulation using any suitable modulation technique, e.g., quadrature amplitude modulation (QAM), at any baud rate.

Figure 5:
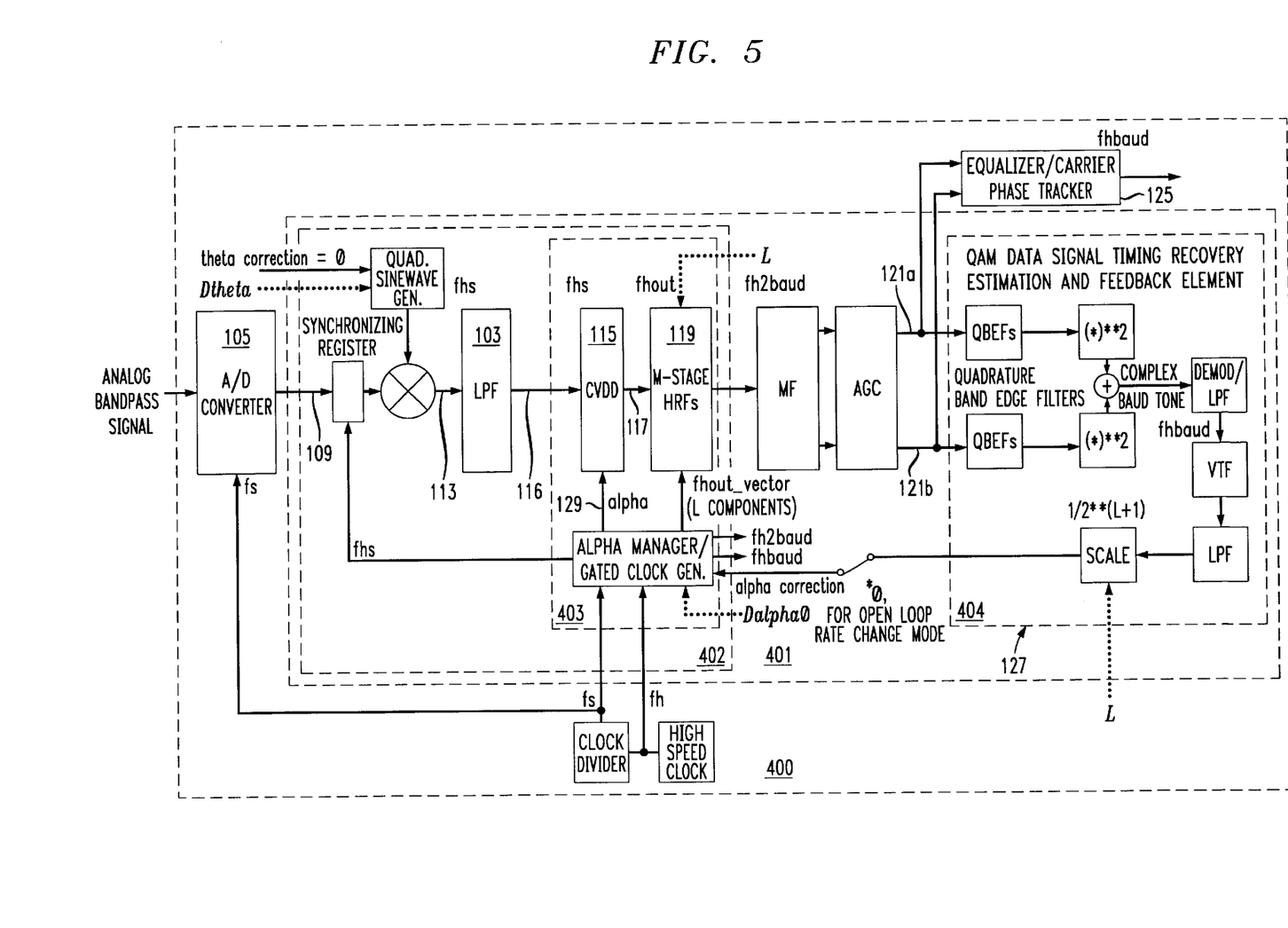
FIG. 5 shows a variable bandwidth channel tuner/variable baud rate QAM demodulator in accordance with another embodiment of the present invention.

FIG. 5 shows a variable bandwidth channel tuner/variable baud rate QAM demodulator 500 in accordance with another embodiment of the present invention. The bold blocks in FIGS. 3 and 5 denote two instances of the respective component corresponding to In-phase and Quadrature streams. Moreover, signals beginning with 'f' denote clock signals, generated by the alpha manager/gated clock generator, with the exception of $f_h$, which denotes the system high speed clock.

The present invention provides a method of efficiently isolating and demodulating a specific spectral sub-band within a sampled, wider band analog signal. Such a method includes the step of sampling the analog signal at a fixed non-unique first frequency $f_s$. The sampled signal is then frequency translated using digital cosine and sine demodulation functions and then digital low pass filtered to produce two baseband sample streams evolving at the initial first frequency rate. The two sample streams are then decimated or interpolated to produce two baseband sample streams at a non-unique second sampling rate, selected preferably to be an integer power of 2-multiple of the desired output rate of the variable bandwidth channel tuner/variable output rate quadrature demodulator sub-system 500.

In particular, denote this second sampling rate as fcvdd= $2^{**}L^*f_{out}$, where L is an integer value, and $f_{out}$ is a desired output sampling rate of the variable bandwidth channel tuner/variable output rate quadrature demodulator sub-system 500 according to this embodiment of the present invention. For a QAM receiver using a Tbaud/2 spaced, fractional equalizer, $f_{out}$=2fbaud. These interpolated sample streams are then successively filtered and half-rate decimated using an L-stage cascade of half-rate decimation filters to produce high fidelity, demodulated spectral sub-band numeric streams at the desired sub-system output rate.

Based upon this method, a variable bandwidth channel tuner/variable output rate quadrature demodulator sub-system 500 in accordance with the principles of the present invention can sample a wider band analog signal at a fixed, non-unique rate $f_s$, and efficiently produce spectrally-pure quadrature-demodulated signal streams corresponding to a user-specified, arbitrary spectral passband-of-interest at a user-specified, arbitrary spectral location within a wider spectral bandwidth analog input signal.

Preferably, an equalizer utilized with the variable bandwidth channel tuner/variable output rate quadrature demodulator sub-system 500 includes carrier phase tracking to handle carrier recovery. Otherwise, a carrier phase tracking loop can be added to the system and a carrier phase error signal input to the digital quadrature demodulator for carrier phase correction.

Having described exemplary embodiments of this invention, it would now be apparent to one of skill in the art that other embodiments incorporating its concept may be used. For example, the embodiments described above utilize a ratio of the third frequency to the fourth (i.e., target) frequency of 2:1. Alternatively, the ratio can be a 3:1, 4:1, or any n:1, where n is a whole number. Preferably, however, the ratio is limited to $2^n$:1, i.e., 2:1, 4:1, 8:1, 16:1, etc.

While the invention has been described with reference to the exemplary embodiments thereof, those skilled in the art will be able to make various modifications to the described embodiments of the invention without departing from the true spirit and scope of the invention.

What is claimed is:

1. A method of demodulating a signal including a digital signal having any of a range of baud rates, comprising:

sampling said signal at a fixed frequency to provide a sampled signal;

demodulating said sampled signal to create samples at said fixed frequency;

variably adjusting a rate of said samples to an arbitrary rate; and decimating said arbitrary rate samples to decimated samples having a rate equal to an integer multiple of a target baud rate.

2. The method of demodulating a signal including a digital signal having any of a range of baud rates according to claim 1, further comprising:

equalizing said decimated samples to output data symbols at said target baud rate.

3. The method of demodulating a signal including a digital signal having any of a range of baud rates according to claim 1, wherein:

said variably adjusted rate is a decimated rate.

4. The method of demodulating a signal including a digital signal having any of a range of baud rates according to claim 1, wherein:

said variably adjusted rate is an interpolated rate.

5. The method of demodulating a signal including a digital signal having any of a range of baud rates according to claim 1, wherein:

said decimating decimates by powers of 2.

6. The method of demodulating a signal including a digital signal having any of a range of baud rates according to claim 1, wherein:

said integer multiple rate is twice said target baud rate.

7. The method of demodulating a signal including a digital signal having any of a range of baud rates according to claim 1, wherein:

said integer multiple rate is less than said arbitrary rate.

8. The method of demodulating a signal including a digital signal having any of a range of baud rates according to claim 1, wherein:

said fixed frequency is not an even number multiple of said arbitrary rate.

9. The method of demodulating a signal including a digital signal having any of a range of baud rates according to claim 1, wherein:
said fixed frequency is not an even number multiple of said target baud rate.

10. The method of demodulating a signal including a digital signal having any of a range of baud rates according to claim 1, wherein:
said range of baud rates includes a range through a factor of 10.

11. The method of demodulating a signal including a digital signal having any of a range of baud rates according to claim 1, wherein:
said range of baud rates includes a range through a factor of 100.

12. A demodulator adapted to receive a data stream having any of a wide range of baud rates, comprising:
an interpolator/decimator adapted to receive a stream of samples at a fixed rate and produce a stream of samples at a second rate;
a decimator adapted to receive said stream of samples at said second rate and produce a stream of samples at a third rate slower than said second rate; and
an equalizer adapted to receive said stream of samples at said third rate and produce a stream of symbols at a fourth rate.

13. The demodulator adapted to receive a data stream having any of a wide range of baud rates according to claim 12, wherein:
said fourth rate is a target baud rate.

14. The demodulator adapted to receive a data stream having any of a wide range of baud rates according to claim 13, wherein:
said third rate is an integer multiple of said target baud rate.

15. The demodulator adapted to receive a data stream having any of a wide range of baud rates according to claim 14, wherein:
said integer multiple is two.

16. The demodulator adapted to receive a data stream having any of a wide range of baud rates according to claim 13, wherein:
said second rate is an integer multiple of said third rate.

17. The demodulator adapted to receive a data stream having any of a wide range of baud rates according to claim 16, wherein:
said integer multiple is a power of two.

18. The demodulator adapted to receive a data stream having any of a wide range of baud rates according to claim 12, further comprising:
a timing recovery circuit adapted to receive an indication of said target baud rate and to control an output rate of at least one of said interpolator/decimator, decimator and equalizer based thereon.

19. The demodulator adapted to receive a data stream having any of a wide range of baud rates according to claim 18, wherein:
said timing recovery circuit receives an indication of a stream of samples output from at least one of said decimator and said equalizer.

20. The demodulator adapted to receive a data stream having any of a wide range of baud rates according to claim 12, further comprising:
an analog-to-digital converter adapted to produce said stream of samples at said fixed rate irrespective of a target baud rate.

21. The demodulator adapted to receive a data stream having any of a wide range of baud rates according to claim 20, wherein:
said analog-to-digital converter receives a quadrature amplitude modulated signal.

22. The demodulator adapted to receive a data stream having any of a wide range of baud rates according to claim 21, further comprising:
a demodulator circuit adapted to receive said stream of samples at said fixed rate and produce baseband in-phase and quadrature samples therefrom;
wherein said interpolator/decimator is adapted to receive both said in-phase and quadrature samples.

23. The demodulator adapted to receive a data stream having any of a wide range of baud rates according to claim 20, further comprising:
a master clock adapted to provide a master clock signal to said analog-to-digital converter, said interpolator/decimator, said decimator and said equalizer.

24. A demodulator adapted to receive a data stream having any of a wide range of baud rates, comprising:
an interpolator/decimator adapted to receive a stream of samples at a fixed rate and produce a stream of samples at a second rate;
a decimator adapted to receive said stream of samples at said second rate and produce a stream of samples at a third rate slower than said second rate;
an equalizer adapted to receive said stream of samples at said third rate and produce a stream of symbols at a fourth rate; and
a timing recovery circuit adapted to receive an indication of said target baud rate and to control an output rate of at least one of said interpolator/decimator, decimator and equalizer based thereon;
wherein said timing recovery circuit controls each of said interpolator/decimator, decimator and equalizer.

25. Apparatus for demodulating a signal including a digital signal having any of a range of baud rates, comprising:
means for sampling said signal at a fixed frequency to provide a sampled signal;
means for demodulating said sampled signal to create samples at said fixed frequency;
means for variably adjusting a rate of said samples to an arbitrary rate; and
means for decimating said arbitrary rate samples to decimated samples having a rate equal to an integer multiple of a target baud rate.

26. The apparatus for demodulating a signal including a digital signal having any of a range of baud rates according to claim 25, further comprising:
means for equalizing said decimated samples to output data symbols at said target baud rate.

27. The apparatus for demodulating a signal including a digital signal having any of a range of baud rates according to claim 25, wherein:
said means for decimating decimates by powers of 2.

28. The apparatus for demodulating a signal including a digital signal having any of a range of baud rates according to claim 25, wherein:
said integer multiple rate is twice said target baud rate.

29. The apparatus for demodulating a signal including a digital signal having any of a range of baud rates according to claim 25, wherein:

said range of baud rates includes a range through a factor of 10.

30. The apparatus for demodulating a signal including a digital signal having any of a range of baud rates according to claim 25, wherein:

said range of baud rates includes a range through a factor of 100.

31. A method of demodulating a data signal contained within a possible wider frequency span signal and having any of a range of baud rates, said method comprising:

sampling said possibly wider frequency span signal at a fixed frequency to provide a sampled signal;

demodulating said sampled signal to create samples at said fixed frequency;

configuring two continuously variable digital rate interpolators/decimators to produce two output streams at a nominal rate equal to a rational rate multiple of the expected nominal baud rate of said data signal;

activating a timing recovery feedback element to provide a sampling time offset adjustment to said two continuously variable digital rate interpolators/decimators, said feedback element adjusting a digital sample rate of said two continuously variable digital rate interpolator/decimators to equal a rational rate multiple of an actual baud rate of said data signal; and digitally equalizing to generate data symbols at said actual baud rate of said received data signal.

32. The method of demodulating a data signal contained within a possible wider frequency span signal and having any of a range of baud rates according to claim 31, wherein:

said digital equalization includes carrier phase tracking.

33. A method of demodulating a signal contained within a possible wider frequency span signal or arbitrary bandwidth, said method comprising:

sampling said possibly wider frequency span sampled input signal at a fixed frequency to provide a sampled signal;

demodulating said sampled signal to create samples at said fixed frequency;

configuring two continuously variable digital rate interpolator/decimators to produce two high spectral fidelity output streams of a frequency sub-band signal having a sample rate equal to a desired rate which is greater than twice a frequency span of said frequency sub-band signal.

* * * * *